(Model.)
J. S. VAN BUREN.
GRATE.
No. 246,575. Patented Aug. 30, 1881.
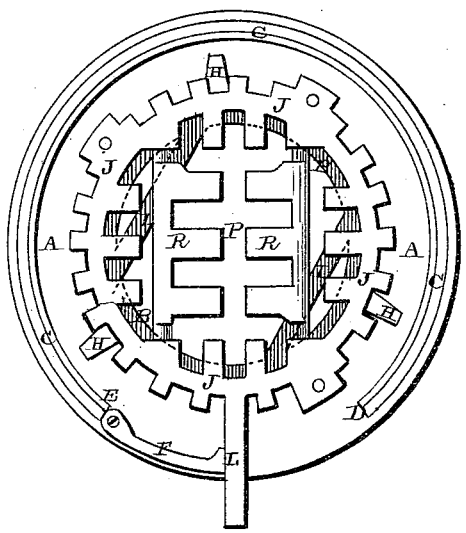
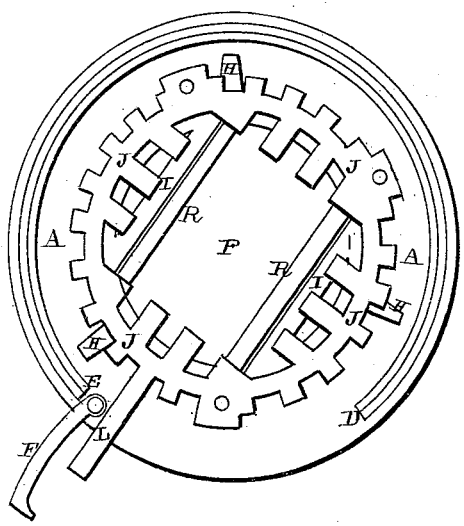
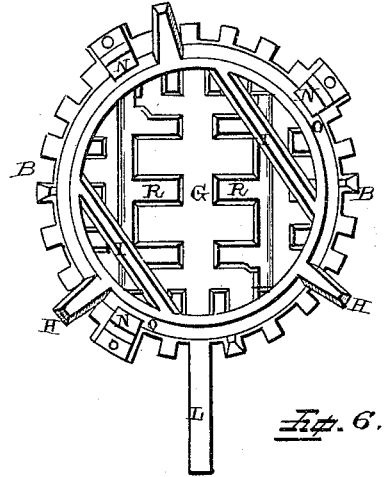
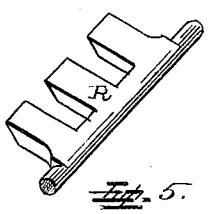
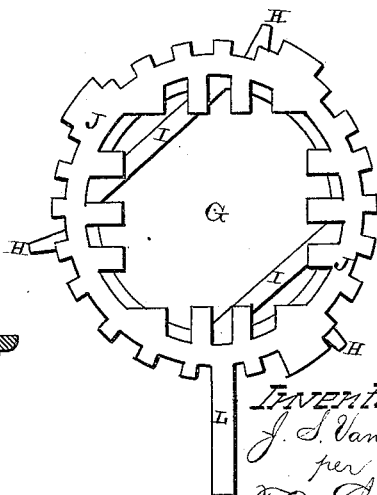
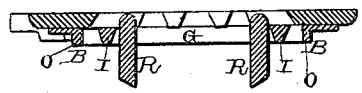
Witnesses.
W. W. Mortimer.
A. C. Kiskadden
Inventor
J. S. Van Buren
per
F. A. Lehmann
Atty

UNITED STATES PATENT OFFICE.

JAFEW S. VAN BUREN, OF ALBANY, NEW YORK.

GRATE.

SPECIFICATION forming part of Letters Patent No. 246,575, dated August 30, 1881.

Application filed June 22, 1881. (Model.)

*To all whom it may concern:*

Be it known that I, JAFEW S. VAN BUREN, of Albany, in the county of Albany and State of New York, have invented certain new and useful Improvements in Grates; and I do hereby declare the following to be a full, clear, and exact description of the invention, such as will enable others skilled in the art to which it pertains to make and use it, reference being had to the accompanying drawings, which form part of this specification.

My invention relates to an improvement in grates; and it consists in the combination of a stationary frame upon which the grate is supported, and which has a suitable opening made through its center, a rotary grate which is loosely attached to this frame, and which has a suitable opening made through its center, and one or more sections of a grate which is pivoted to this rotary grate in the opening made through its center, and which sections, when the grate is turned around to a certain point, drop downward, so as to discharge the coal and ashes upon them through the opening in the grate and the opening through the supporting-frame into the ash-pit below.

It further consists in a rotary grate having two sections of a grate pivoted in its center, and which sections drop downard, so as to discharge the contents of the fire-pot when the grate is turned into a certain position, and which sections automatically assume a horizontal position when the grate is turned around into position again, as will be more fully described hereinafter.

The object of my invention is to produce a grate which, as long as it is turned to a certain point, will act as a shaker in the bottom of the stove, but which, when turned beyond this point, allows its whole center to drop downward, so as to discharge the contents of the fire-pot into the ash-pan below, and which grate, when turned back into position, has its center automatically closed.

Figure 1 is a plan view of my invention, showing the grate when in position to support the fire in place. Fig. 2 is a similar view, showing the grate swung around so as to discharge the contents of the fire-pot through its center. Fig. 3 is an inverted view of the supporting-frame and grate. Fig. 4 is a detached view of one of the sections of the grate. Fig. 5 is a plan view of the grate with both sections removed. Fig. 6 is a vertical section of the grate, showing the sections dropped downward.

A represents that portion of the stove to which the supporting-frame B is secured or attached in any manner that may be preferred. The base A of the stove may be either of the form here shown or any other that may be preferred, and has a flange, C, extending partially around its top, as shown. The end D of this flange serves as a stop to prevent the grate from turning around in that direction, and inside of the other end, E, is pivoted a stop, F, which can be moved back, as shown in Fig. 2, when it is desired to turn the grate far enough to dump the contents of the fire-pot into the grate below.

The supporting-frame B is made circular, and has an opening, G, made across its center, extending from side to side. This opening is circumscribed on two of its sides by the cross-bar I, which forms a part of the frame, and which makes the opening narrower in one direction than in the other. This supporting-frame is supported above the part A of the stove, at its edges, by the projections H, which rest upon or fit in recesses which have been formed in the frame for it.

The grate J is made in the circular form shown, and is provided with a handle, L, by means of which it can be turned back and forth upon the supporting-frame B, to which it is attached by means of the catches N. These catches N catch under the flange O, which is formed upon the outer edge of the supporting-frame, and prevent the grate from being detached from the frame, while they allow it to turn freely back and forth upon it. Through the center of the grate is made an opening, P, as shown, and in this opening are pivoted in any suitable manner the two sections of the grate R. These sections are pivoted at their two outer corners, so as to leave their inner ends free to drop downward from their own weight as soon as the grate is turned in such a manner that the frame B no longer acts as a support for them. While the stop is turned into a line with the flange so that the handle of the grate can only be moved back and forth between the end D of the flange C and the end of the stop the two sections are supported upon the cross-bars I of the supporting-frame. In this position the grate acts as a shaker for the stove.

When it is desired to dump the contents of the fire-pot the stop is swung backward out of the way, and then the grate is moved by means of its handle around until the handle strikes against the inner end of the stop. This movement of the grate brings the two sections of the grate directly over the opening through the supporting-frame B, and in such a manner that the bars I no longer catch under the sections, and the sections, having nothing to support them, drop downward from their own weight through the opening in the supporting-frame, as shown in Fig. 6, thus allowing all the contents of the fire-pot to drop through into the ash-pit below. It is only necessary to turn the grate into position, when the two sections will drop from their own weight, even if there is nothing in the fire-pot to force them down. In moving the grate back into its first position the cross-bars I of the supporting-frame B strike against the under sides of each one of the sections of the grate and automatically raise them into position again. Thus it will be seen that it is only necessary to move the stop back, and turn the grate around until the two sections are in a line with the opening through the supporting-frame, when the contents of the fire-pot will be dropped into the ash-pit below, and then, as the grate is turned back into position, the two sections are automatically raised into place again.

Having thus described my invention, I claim—

1. The combination of a rotary grate having one or more falling sections of grates pivoted therein, a stationary supporting-frame having an opening through its center corresponding to the opening in the grate, and provided with cross-bars for raising the section or sections up into position as the grate is turned around, substantially as shown.

2. The combination of the supporting-frame B, provided with the cross-bars I, and having an opening through its center, with the grate which is attached to the frame in such manner as to have a rotary movement thereon, and which grate is provided with sections which are adapted to drop downwardly, whereby, when the sections are moved into a line with the opening through the supporting-frame, the sections will drop, so as to discharge the contents of the fire-pot, and then, as the grate is moved into position, will rise into place again, substantially as set forth.

3. The combination of the frame A, provided with a stop to check the movement of the grate, a supporting-frame having an opening through its center and provided with the cross-bars I, a rotary grate attached to the supporting-frame and having an opening through its center, the sections of the grate, which are adapted to drop downward when turned in a line with the opening in the supporting-frame, and a pivoted stop, the parts being combined and arranged to operate substantially as specified.

In testimony whereof I affix my signature in presence of two witnesses.

JAFEW S. VAN BUREN.

Witnesses:
J. T. REIFSNIDER,
EDMOND RAFTERY.